United States Patent [19]
Porfido et al.

[11] Patent Number: 5,674,588
[45] Date of Patent: Oct. 7, 1997

[54] WELDING SLEEVE FOR PLASTIC PIPE

[75] Inventors: Erasmo Porfido, Schaffhausen; Dirk Alexander Petry, Feuerthalen, both of Switzerland

[73] Assignee: Georg Fischer Rohrleitungssysteme AG, Schaffhausen, Switzerland

[21] Appl. No.: 436,342

[22] PCT Filed: Sep. 22, 1994

[86] PCT No.: PCT/CH94/00188

§ 371 Date: Jun. 12, 1995

§ 102(e) Date: Jun. 12, 1995

[87] PCT Pub. No.: WO93/08854

PCT Pub. Date: Mar. 30, 1995

[30] Foreign Application Priority Data

Sep. 22, 1993 [DE] Germany ............ 43 32 194.1

[51] Int. Cl.[6] ............................................. F16L 47/00
[52] U.S. Cl. ............ 428/136; 428/139; 428/156; 428/99; 219/544; 285/21.1; 285/21.2; 285/292; 29/611; 29/619; 264/272.11; 264/272.18; 264/279.19
[58] Field of Search ............ 428/139, 136, 428/156, 99; 285/21, 292, 21.1, 21.2; 29/611, 619; 264/272.11, 272.18, 272.19; 219/544

[56] References Cited

U.S. PATENT DOCUMENTS

| | | | |
|---|---|---|---|
| 4,224,505 | 9/1980 | Sturm | 219/544 |
| 5,088,933 | 2/1992 | Ribbeck | 439/395 |
| 5,163,713 | 11/1992 | Brettell et al. | 285/21 |
| 5,228,186 | 7/1993 | Brettell et al. | 29/611 |
| 5,252,810 | 10/1993 | Trosch et al. | 219/544 |

FOREIGN PATENT DOCUMENTS

| | | |
|---|---|---|
| 396273 | 11/1990 | European Pat. Off. . |
| 416306 | 3/1991 | European Pat. Off. . |

Primary Examiner—William Watkins
Attorney, Agent, or Firm—Bachman & LaPointe, P.C.

[57] ABSTRACT

A welding sleeve includes a sleeve body having a recess for receiving a plug contact. The recess has sidewalls and a bottom wall. The bottom wall is provided with a projection which defines with the side walls of the recess a pair of slots. The plug contact includes an insertion part adapted to be received within the recess. The insertion part includes leg portions to be received in the slots of the recess and a slit between the legs adjacent the top surface of the projection. The slit receives a portion of the heating element which rests on the top surface of the projection. The width (b) of the slit is less than the diameter (d) of the heating element so as to insure good electrical contact.

2 Claims, 1 Drawing Sheet

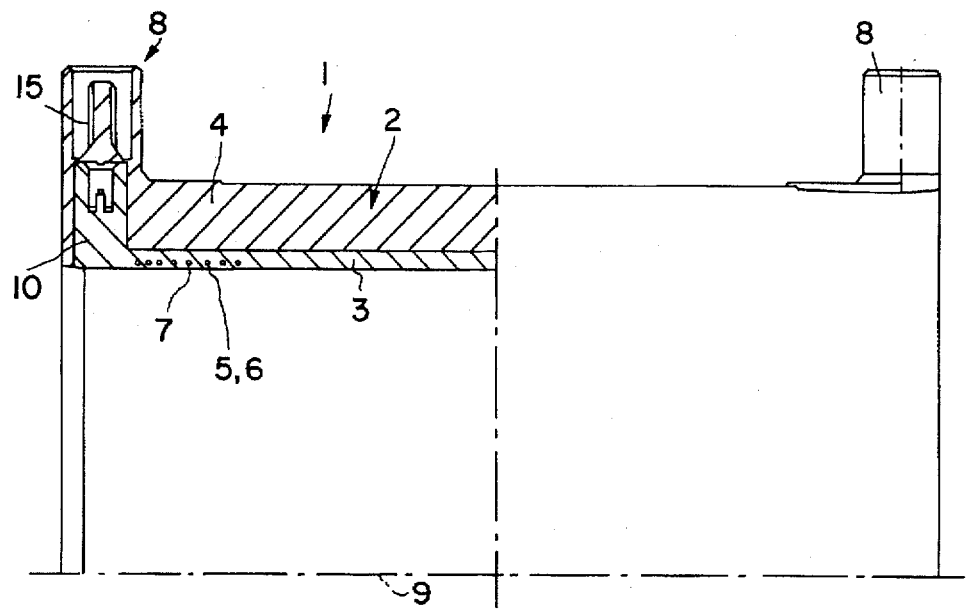
FIG. 1
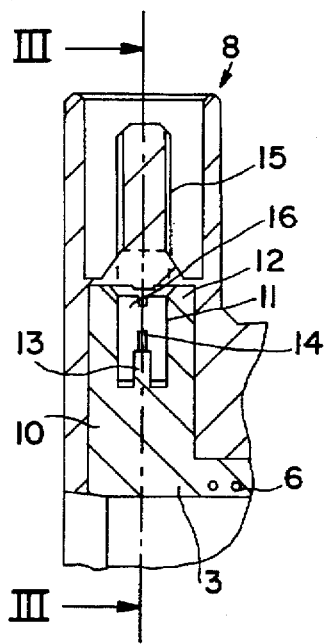
FIG. 2
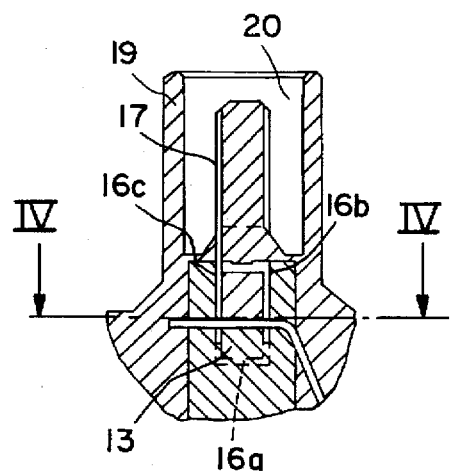
FIG. 3
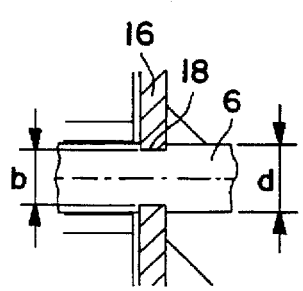
FIG. 5
FIG. 4

WELDING SLEEVE FOR PLASTIC PIPE

BACKGROUND OF THE INVENTION

The present invention relates to a welding sleeve comprising a plastic molded piece having a heating element and an improved plug contact for connecting a source of current to the heating element.

A plastic molded piece of the aforementioned type which is formed as a welding sleeve is known, for instance, from Federal Republic of Germany 28 23 455 C3, in which the plug contact is formed directly by the resistance wire of the heating element, the wire being arranged in the form of a loop over an arm which is arranged within a recess.

The foregoing welding sleeve has the disadvantage that the resistance wire is not fastened, so that a dependable plug connection to the source of current is not assured and a plastic-covered resistance wire must first of all have the insulation removed from its end as plug contact before formation of the loop.

It is the principle object of the present invention to provide a welding sleeve comprising a molded piece of the aforementioned type, which permits an automated production of plug connections for the heating element even when an insulated resistance wire is used, in which connection the plug connection must assure a dependable connection to a source of current.

SUMMARY OF THE INVENTION

In accordance with the invention, the foregoing object is achieved by providing a welding sleeve having an improved plug contact for assuring a good connection between the source of current and the heating wire of the welding sleeve.

The process of the invention makes simple automated production of a plug connection possible in the case of molded pieces having heating elements, which process can be used both with bare resistance wires and with plastic-covered resistance wires.

BRIEF DESCRIPTION OF THE DRAWINGS

The invention is shown, by way of example, in the accompanying drawings and will be described below. In the drawings:

FIG. 1 shows half of a welding sleeve, in part in longitudinal section;

FIG. 2 is an enlarged view of the portion having the plug connection of FIG. 1;

FIG. 3 is a section along the line III—III of FIG. 1;

FIG. 4 is a section along the line IV—IV of FIG. 3 before the coating of the winding support; and FIG. 5 is an enlarged view of a part of FIG. 4.

DETAILED DESCRIPTION

FIG. 1 shows a molded piece, developed as welding sleeve 1, for connecting tubular parts of thermoplastic material. A sleeve body 2 consists of an inner sleeve part 3 developed as winding support and of an outer sleeve part 4. A heating element 5 which consists of a resistance wire 6 embedded in the inner sleeve part 3 or inserted in turns in grooves 7 is arranged on the inner sleeve part 3.

Plug connections 8 for the feeding of the current are arranged on the two ends of the resistance wire 6.

FIGS. 2 to 5 show a plug connection on a larger scale. For this purpose, retaining elements 10 are integrated in or formed on the ends of the winding support 3.

The retaining element 10 has a recess 11 which is preferably developed with square cross section and is surrounded by a side wall 12 which is correspondingly square. A projection 13 is arranged within the recess 11 and has side surfaces 13' which define with side wall 12 slots 24.

The two opposite walls 12a, 12b of retaining elements 10 are openings provided with opening 14 which extend transverse to the longitudinal axis 9 of the welding sleeve. The corresponding end of the resistance wire 6 is inserted into the slits 14 upon the winding onto the winding support 3 and thereby comes to rest on the projection 13.

A plug contact 15 which can be inserted into the recess 11 of the retaining element 10 and is produced by shaping from a metal sheet has an insertion part 16 and a connection part 17. The connection part 17 is developed either as a flat plug or, preferably, as a round plug, the sheet metal being shaped into a tubular part in the case of the second embodiment. The insertion part 16 is shaped from the sheet metal either in U-shape or, as can be noted from FIG. 2 and FIG. 3, in rectangular shape, and has opposed legs 16' which define a slit 18 and a second slit 22 on the three wall parts 16a, 16b, and 16c. Slit 22 is wider than slit 18.

As can be noted from FIG. 5, the width b of the slit 18 is somewhat smaller than the diameter d of the bare resistance wire 6.

Upon the insertion of the plug contact 15 into the recess 11, the slit 18 of the insertion part 16 is pushed over the resistance wire 6, a simultaneous cutting into and clamping of the resistance wire 6 being produced and thus also a good contact for the current between plug contact 15 and resistance wire 6 and projection 13 is received in slit 22 when the legs of insertion part 16 are located in slots 24.

If a plastic-covered resistance wire 6 is used, the covering is cut through and the wire cut into at the same time. In this way, a separate operation is not necessary for the removal of the plastic covering at the end of the wire.

After the winding of the resistance wire 6 on the winding support 4 and the insertion of the plug contacts 15 into the recesses 11 in the retaining elements formed on the winding support 3, the winding support is introduced on a mandrel into an injection mold and the outer sleeve part 4 is produced by molding around it. In this connection, all hollow spaces between the retaining element 10 and the plug contact 11 are filled with plastic, whereby the cut connection between the resistance wire 6 and the plug contact 15 is firmly embedded in plastic. At the same time, a wall is formed around the plug contact 15, as a result of which the plug connection is accessible, protected by the wall, a free space 20 for the production of the plug connection.

If the heating element 5 is made from a resistance wire covered with plastic, without winding support, then the two ends of the wire are connected with separate plastic retaining elements 10 and with plug contacts 15 as already described.

The winding which is connected in this way with plug contacts can then be molded around, as already described, in order to form the body of the sleeve.

If the heating element is developed as a heating mat, the retaining elements 10 having the plug contacts 15 are fastened from the side of the welding surface to a molded piece.

This arrangement is preferably used in the case of molded pieces developed as spot-drill fixtures or branching fixtures which have a saddle part, adapted to be placed on a pipeline, with heating mat arranged on the inner circumference.

We claim:

1. A welding sleeve comprises a sleeve body having a heating element and a plug contact for connecting the heating element to a source of current, the improvement comprising: a recess provided in said sleeve body for receiving said plug contact, said recess having side walls and a bottom wall, a projection on said bottom wall having a top surface and side surfaces which define with two opposed side walls a pair of slots; said plug contact having an insertion part received within the recess, said insertion part having leg means received in said pair of slots, said leg means defining a first slit means adjacent said top surface of said projection for receiving a portion of the heating element which rests on said top surface of said projection wherein the width (b) of the slit is less than the diameter (d) of the heating element so as to insure good electrical contact and second slit means below and wider than said first slit means for receiving the side surfaces of the projection.

2. In a process for insuring good electrical contact between a plug contact and a heating element in a welding sleeve comprising a sleeve body having a heating element and a plug contact for connecting the heating element to a source of current, the improvement comprising the steps of:

forming a recess in the sleeve body, said recess having a side wall and a bottom wall having a projection including a top surface and side surfaces which define with the side wall at least two slots;

providing a plug contact with an insertion part, said insertion part having at least two leg means which define a first slit of width (b) and a second slit, said first slit being smaller than and above said second slit;

locating a portion of the heating element on the top surface of the projection; and inserting the insertion part of the contact plug in said recess wherein said heating element is received within said first slit of width (b) which is less than the diameter (d) of the heating element and said projection is received within said second slit.

* * * * *